United States Patent [19]

Evans

[11] 4,289,176

[45] Sep. 15, 1981

[54] BATTERY FILLER

[75] Inventor: Christopher P. Evans, Bolton, England

[73] Assignee: Chloride Group Limited, London, England

[21] Appl. No.: 82,224

[22] Filed: Oct. 4, 1979

[30] Foreign Application Priority Data

Oct. 9, 1978 [GB] United Kingdom ............... 39775/78
May 29, 1979 [GB] United Kingdom ............... 18584/79

[51] Int. Cl.³ .............................................. B65B 3/34
[52] U.S. Cl. ...................................... 141/35; 141/59; 141/198; 141/231
[58] Field of Search ................. 137/571; 141/1, 7, 35, 141/59, 94, 95, 126, 198, 231

[56] References Cited

U.S. PATENT DOCUMENTS 3,189,063 6/1965 Lowe ................................ 141/35 X
3,880,209 4/1975 Haughn et al. .................. 141/198 X
4,007,764 2/1977 Bandemor ....................... 141/198 X Primary Examiner—Frederick R. Schmidt
Attorney, Agent, or Firm—Oblon, Fisher, Spivak, McClelland & Maier

[57] ABSTRACT

A device for filling or topping-up batteries, including a trolley, a reservoir for acid or distilled water, and conduits for connection to the inlet and the outlet ends of a series of filler devices, one on each battery cell. At the end of the series a conduit is connected to a sump on a trolley. A pump draws liquid by siphon from the reservoir through the filling devices to the sump. A level responsive switch in the sump is used for terminating the filling operation which can be performed automatically by connecting the conduits and switching on the equipment. A timer and an air valve ensure that all the liquid is sucked out of the line after the cells have been filled before the pump is switched off. Automatic connections connect the inlet and outlet to exhaust through explosion minimizing vents once the conduits have been disconnected.

14 Claims, 5 Drawing Figures

BATTERY FILLER

BACKGROUND OF THE INVENTION

1. Field of the Invention

This invention relates to a battery filler for filling a number of electric storage battery cells with acid, or topping them up with distilled water from a reservoir, for example, for use with an assembly of electric storage batteries mounted in a vehicle for propulsion of the vehicle.

2. Summary of the Invention

An object of the present invention is to provide a battery filler which is simple and safe to use.

According to the invention, a battery filler includes a reservoir, a conduit assembly for leading fluid from the reservoir to one or more cells having filling devices which prevent further liquid entering the cell when a certain level has been reached, and a pump coupled to the conduit means downstream of the batteries for drawing fluid by vacuum or suction from the reservoir to the cells.

The pump reduces the pressure in the conduit assembly, and so tends to prevent any loss of acid from the cells through any slight leaks in the conduits.

Preferably there is a sump in the conduit assembly between the cells and the pump, in which liquid drawn through the conduit assembly by siphon, once the cells have all been filled. The liquid can be collected after being from the sump can eventually be returned to the reservoir by opening a drain valve in a connection from the sump to the reservoir.

Preferably there is a level responsive switch in the sump arranged to initiate emptying of the conduit assembly. Thus, when the level in the sump rises to the level of the switch, it will be known that the cells are all full. However, there will still be liquid in the conduit means, and so operation of the pump can continue, for example, for a predetermined interval set on a timer during which time air at atmospheric pressure may be introduced to the conduit assembly at the reservoir end in order to displace the excess liquid and drive it into the sump under the suction provided by the pump. After the conduit assembly has been evacuated, the pump can then be switched off, and the drain valve opened, and then it can be arranged that a lamp or other indicator shows that the conduit assembly can be disconnected from the battery.

The conduit assembly can be arranged to be connected to the battery by simple connections, so that after they have been connected, and the equipment has been switched on, it can be left until the indicator shows that filling has been completed, and then the conduits can be simply disconnected.

The reservoir, sump, pump and conduit means are all conveniently mounted on a trolley for easy movement from one set of batteries to be filled to another.

The emptied liquid can be returned to the reservoir by way of a large pipe having an explosion minimising vent, so that gas can escape safely if the unit is inadvertently left connected during charging.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a diagrammatic view of a filling arrangement for filling (which expression includes topping-up) a battery 10 comprising a number of cells 12, each provided with a level control device 16 shown in detail in FIG. 2.

DETAILED DESCRIPTION OF THE PREFERRED EMBODIMENTS

Figure 1:
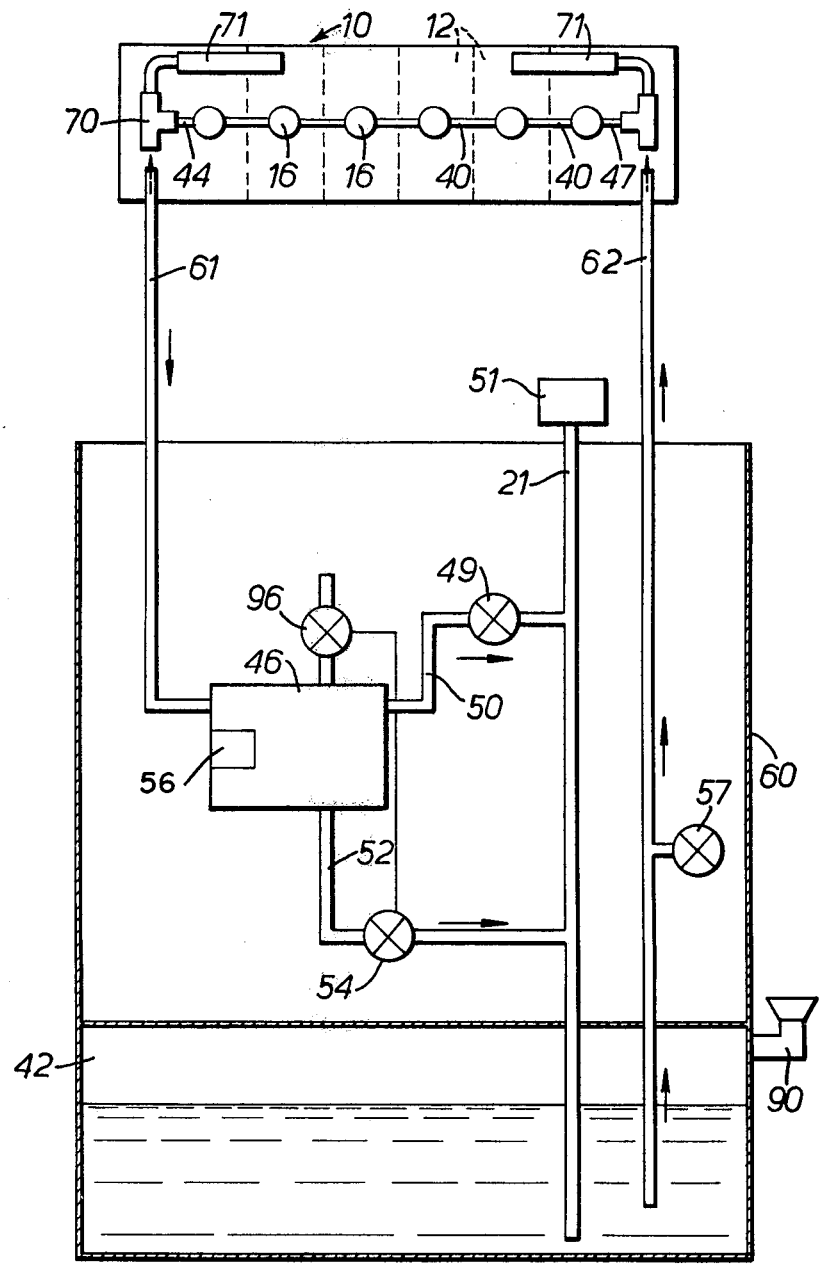
FIG. 1 is a diagrammatic view of a battery filling system embodying the invention.

Each device 16 has an inlet and an outlet 28 (which are similar to one another.) The outlet of one cell is connected to the inlet of the next cell by means of a short flexible tube 40.

Thus, the devices 16 are connected in series and as described below, if liquid is supplied to one end of the series, (it is immaterial which end), which will be termed the inlet pipe 47, it will flow into each cell in turn to fill it to the desired level. Gases and air will escape through the other end of the series via, the outlet pipe 44, and will be accompanied by liquid when all the cells are filled to the desired level.

Figure 2:
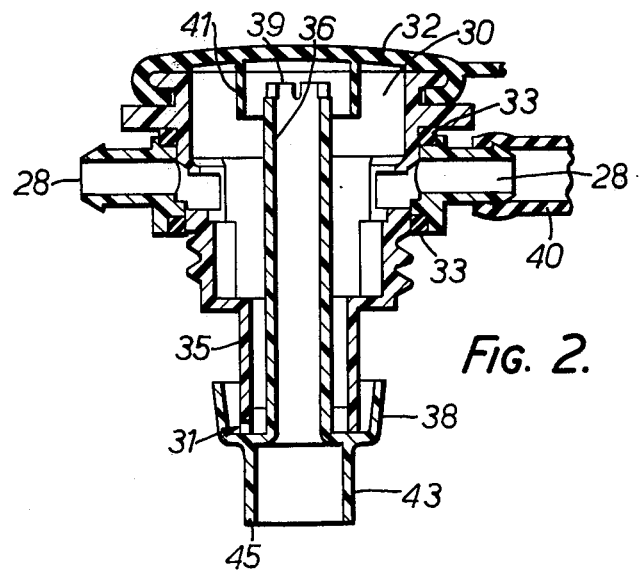
FIG. 2 is an enlarged sectional elevation of a level control device used in the system of FIG. 1.

As shown in FIG. 2, each device 16 defines a liquid chamber 30 into which the inlet 28 and outlet 28 enter at diametrically opposing points. The chamber has in its bottom a central hole from which a filling tube 35 projects downwards with a castellated lower end 31. A vent tube 36 extends up co-axially through the filling tube so as to leave round it an annular space for liquid to flow down. The vent tube is provided with a skirt 38 to provide a seat for, and a liquid trap around, the lower edge of the filling tube.

The top 39 of the vent tube extends close to the top of the chamber 30 which is defined by a removable flexible rubber cap 32 having a depending tubular baffle 41 which forms, with the castellated top of the vent tube 36, an airlock preventing liquid from trickling down the vent tube, and forces any liquid flowing from the inlet to the outlet to follow a tortuous path round one of the semi-circular channels surrounding the baffle 41.

At its lower end, the vent tube is provided with an enlarged bell 43.

When it is desired to top up the battery, water flows into the inlet of the first cell 12, down to the bottom of the chamber 30, thence into the filling tube 35 and down through the annular space between the filling tube and vent tube, through the castellation gaps in the lower edge of the filling tube, over the skirt 38 and into the cell. The cell being sealed, air simultaneously flows out through the vent tube, over its upper edge 39 under the baffle 41 and out through the outlet. As soon as the liquid in the cell rises to the level of the bottom edge 45 of the bell 43, further escape of air is prevented and a head of liquid will build up in the bell 43. A similar head of liquid will build up in the chamber 30 causing a corresponding difference of level between the liquid outside and inside the skirt 38 until ultimately the chamber 30 becomes almost filled with liquid and further liquid flows on through the outlet to the next cell.

The inlet 28 and outlet 28 are formed in a separate plastics moulding surrounding the moulding defining the body 30 and sealed to it by 'O' rings 33 after the body moulding has been screwed into the top of the cell 12, by turning in relation to the inlet and outlet 28. The cap 32 is removable to permit the introduction of a hydrometer or a thermometer into the chamber 30.

In a service unit or trolley 60, a reservoir 42 for acid or distilled water is connected by a conduit 62 to the inlet 47 at one end of the series of devices 16 for affording fluid flow through to the cells. The reservoir 42 is vented to atmosphere through an outlet 90 which also serves as an inlet for replenishing the reservoir. A sump 46 is connected by a conduit 61 to the outlet 44 at the remaining end of the series of devices 16. An upper conduit 50 containing a pump 49 leads from the sump 46 to a stand pipe 21 extending between the reservoir 42 and an explosion minimizing vent 51. A lower conduit 52 containing a drain valve 54 also leads from the sump 46 to the stand pipe 21.

During filling of the cells, the drain valve 54 is closed and the pump 49 is started so that gas is drawn from the cells and from the line 44 through the sump 46 by suction to be discharged to atmosphere through the stand pipe 21 and vent 51. Liquid is then drawn by suction from the reservoir 42 through the conduit 62 and the inlet 47 into the cells 12, and thence through the conduit 61.

The liquid fills each of the battery cells 12 to the desired level as described above.

After all the cells 12 are full, liquid flows into the sump 46.

The stand pipe 21 has a cross-sectional area several times larger than that of the conduits 50 and 52, and its lower end is below the lower end of the conduit 62 and so below the minimum liquid level in the reservoir. Thus, gas cannot accumulate in the reservoir, while surplus water from the sump 46 either by way of the pump 49 if a float valve in the sump fails, or by way of the valve 54, can return to the reservoir.

The pump 49 tends to prevent dripping of liquid from any leak, because if there is a leak in a conduit or in a connection, the pump tends to maintain a sub-atmospheric pressure in it.

The reservoir 42 for acid or distilled water, together with the sump 46, the pump 49 and associated valves and pipework, are carried by the service unit trolley 60 from which the delivery and receiving conduits 62 and 61 extend to the battery to which they are removably secured by simple couplings (for example screwed connections or bayonet joints) so as to allow the trolley to be readily disconnected from a filled battery. Preferred couplings include two-way valve sockets 70 which can also connect the pipe 44 or 47 with explosion inhibitors 71 of conventional form when filling is not in progress.

Figure 3:
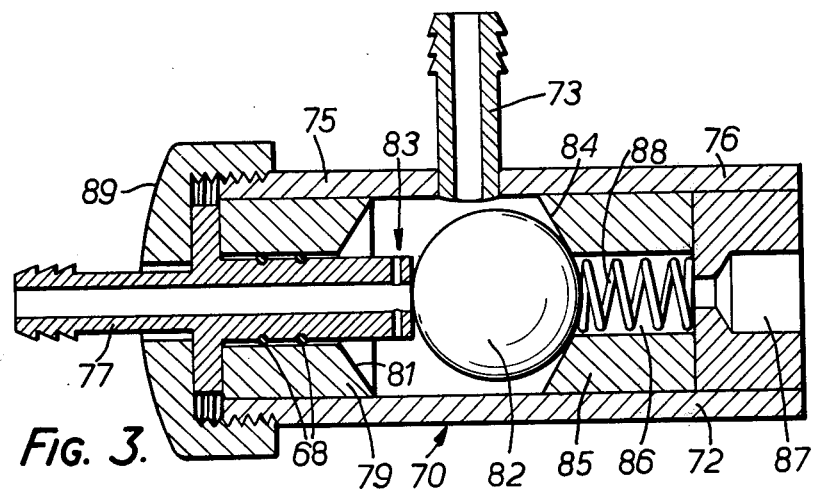
FIGS. 3 and 4 are enlarged diagrammatic sections of alternative forms of two-way valve sockets used in the system of FIG. 1.

A valve socket 70 is shown in detail in FIG. 3 and includes a casing 72 having a stem connection 73 connected to the pipe 44 or 47 of an end cell of the battery and a pair of branch connections 75 and 76 to which the connection 75 is formed as a screwed section to receive an end cap 89 on a connector 77 on the conduit 61 or 62. The connector 77 is sealed by 'O' rings 68 in a plug 79 in the end of the connection 75, and defining a seat 81 for a ball valve member 82. The connector 77 has radial outlets 83 for allowing flow to the connector 73 when the valve is open.

In that situation the ball 82 is pushed by the connector 77 away from the seat 81 against a seat 84 in a plug 85 in the other connection 76, to close a central aperture 86 leading to an outlet 87 for connection to the explosion inhibitor 71, which is preferably a block of sintered polyethylene screwed into the outlet 87.

A compression spring 88 in the aperture 86 normally biasses the ball against the seat 81 so that the conduits 44 and 47 are connected to exhaust through the inhibitors 71 when filling is not taking place.

Figure 4:
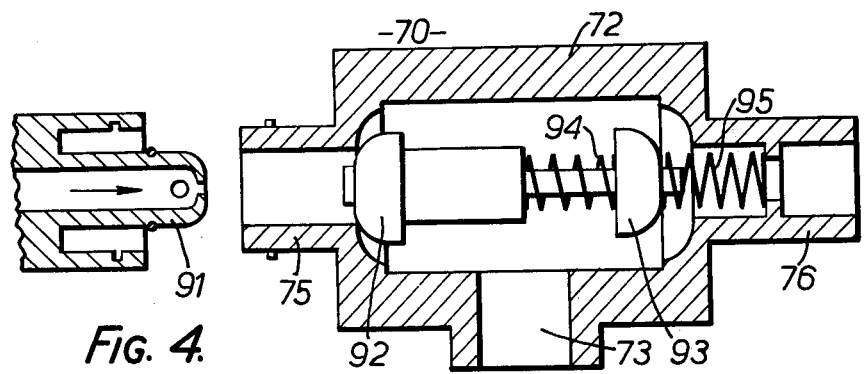

An alternative form of coupling is shown in FIG. 4. Similar components have the same reference numerals. In this form, the connection 75 is formed as a bayonet socket to receive a plug-in connector 91 on the conduit 61 or 62 while the connection 76 is connected directly or by a pipe 78 to the associated explosion inhibitor 71.

Within the housing 70 is a changeover valve which includes a pair of poppets 92 and 93 having a relatively strong spring 94 interposed between them in a totally relaxed condition, and a comparatively weak spring 95 urging both of them towards the bayonet plug connector 91.

Accordingly, when the bayonet plug connector is removed, in normal use of the battery, the poppet 92 closes so as to shut off the pipe connector 75, and the poppet 93 is simultaneously withdrawn from its seal so as to connect the battery cells to the explosion inhibitor 71.

When the battery is to be filled or topped up, the bayonet plug connectors 91 are inserted in the respective connections 75 of the two couplings, and in each coupling the poppet 92 is pushed open, while the poppet 93 is closed, and the connector 91 is put into communication with the stem connector 73 which is cut off from the outlet 76.

If the tubes connecting the battery to the explosion minimizing vents 71 were manually disconnected for connections to the topping up trolley 60, there would be the danger that the maintenance man may omit reconnecting the explosion minimizing vents on completion of the topping up, thus introducing the danger of explosion. By means of the automatic two-way valve socket, this danger is eliminated and the act of disconnecting the topping up trolley from the battery automatically reconnects the battery to the explosion minimising vents.

It should be noted that should the filler trolley be left connected to the battery at the end of the filling operation, the battery may be charged, because all explosive charge gases will be safely vented to atmosphere via the drain valve 54, the stack pipe 21 and the explosion minimizing vent 51.

It is believed that the arrangement of the electric circuit and fluid flow circuit will be apparent from the following description of its operation.

Filling or topping up can be performed while the battery is on a vehicle.

Having ensured that the conduits 61 and 62 have been correctly connected to the valve sockets 70, and a trailing cable connected to a suitable power source the user switches on a main input switch 63 to energize a transformer and rectifier arrangement 64 and provide a 24 volts D.C. supply. An indication lamp 67 lights up to show the unit is live. The drain valve solenoid 66 which actuates the normally open drain valve 54 is initially de-energized upon connection to the voltage supply source. In this state the normally open drain valve 54 allows any liquid in the sump 46 to drain back into the water reservoir 42. The sump 46 can be vented to atmosphere through a valve 96 arranged to be opened automatically when the drain valve 54 opens.

Figure 5:
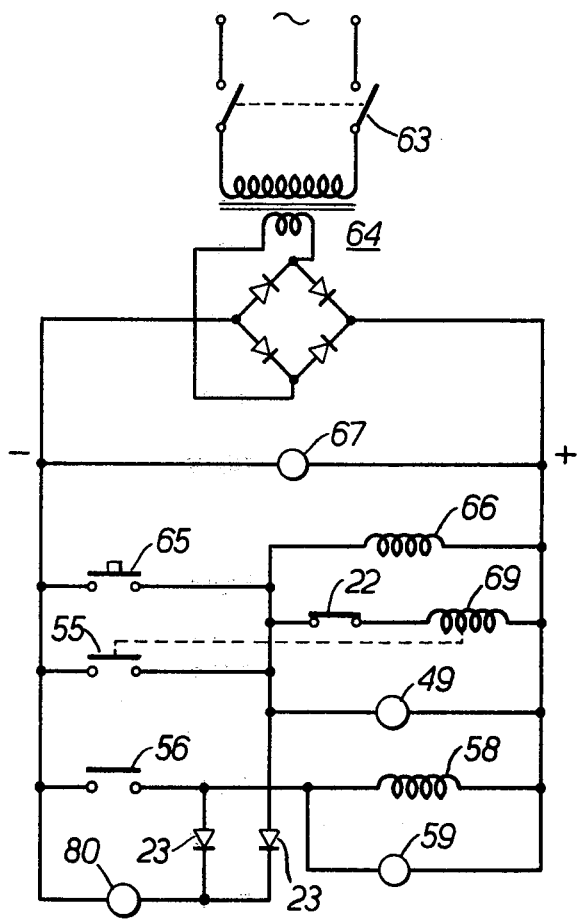
FIG. 5 is an electric circuit diagram.

The user then initiates starting of the pump by depressing a button 65. As schematically depicted in FIG. 5, this energizes a relay 69 which is held by its single holding contact 55 after the button 65 is released. The solenoid 66 is energized for closing the normally open drain valve 54 and the pump motor 49 is started.

Air is evacuated from the filling system and the battery is automatically filled or topped up to the correct level as liquid is drawn through the pipework arrangement sequentially from cell to cell.

When the cells are all sufficiently full, the flow returns via the conduit 61 back to the trolley and enters the sump 46. When this returned water reaches a preset level a float switch 56 closes. At this point one can be satisfied that all the cells in the system have been topped up and excess water only is being drawn back into the trolley. An air valve 57 at the trolley end of the conduit 62 is opened by energizing of a solenoid 58 upon closing of float switch 56 as detailed in FIG. 5, and allows all the excess water in the pipework to be sucked out by the pump to the sump 46.

When the float switch 56 closes, an electrical timer 59 is also started and after a period of time pre-selected to be sufficient to suck out all the excess water in the pipework, the timer 59 opens a normally closed contact 22 and de-energizes the relay 69. As schematically detailed in FIG. 5, the relay contact 55 opens and the pump motor 49 loses its supply and stops, and the drain valve 54 opens as its solenoid 66 is de-energized to allow water to drain from the sump 46. When the liquid level in the sump falls sufficiently, the float switch 56 reopens deenergizing solenoid 58, which closes, the air valve 57, and the timer 59 is reset. A lamp 80 normally short-circuited by the contact 55 or the switch 56, illuminates indicating that topping up is complete and the trolley is ready for disconnection from the battery.

The filler may then be disconnected from the battery.

It will be appreciated that once the trolley has been switched on it automatically goes through the filling procedure. There is no need for an operator to be in attendance whilst topping up is actually taking place. A visual indication is given at the completion of the sequence to tell the operator that the trolley can be disconnected and the battery placed on charge.

Whilst the proposed arrangement employs a subatmospheric pressure in the system, the invention is not limited thereto.

The resistance of the lamp 80 is large compared with those of the solenoid 66, the relay winding 69 the pump motor 49, the solenoid 58, and the timer 59, so that none of those components is energized if the switches 65, 55, and 56 remain open. Unless one of those switches is closed, the lamp 80 is on while the lamp 67 is on.

Obviously, numerous modifications and variations are possible in light of the above teachings. It is therefore to be understood that within the scope of the appended claims, the invention may be practiced otherwise than as specifically described herein.

What we claim as our invention and desire to secure by Letters Patent is:

1. A battery filler comprising:
   a reservoir,
   conduit means for leading fluid from the reservoir to one or more cells of a battery,
   a filling device for each of said cells which prevents further liquid entering each of said cells when a predetermined level has been reached,
   a pump coupled to the conduit means downstream of said cells for drawing fluid by suction from the reservoir to said cells,
   a sump in the conduit means between said cells and the pump,
   a level-responsive switch in the sump arranged to initiate emptying of the conduit means by the pump when the liquid in the sump reaches a predetermined level,
   a drain valve from the sump closed during filling and open after filling is completed in response to operation of said level-responsive switch,
   a trolley upon which the conduit means, the pump, the sump, said level-responsive switch and said drain valve are mounted, and
   means enabling the trolley to be moved from battery to battery.

2. A filler as claimed in claim 1 further comprising a normally closed valve in the conduit means upstream of said cells and downstream of the reservoir opened in response to operation of said level-responsive switch to open the conduit means to atmosphere.

3. A filler as claimed in claim 1 further comprising a contact member and a timer for operating said contact a predetermined time after operation of said level-responsive switch, for opening said drain valve.

4. A filler as claimed in claim 3, said timer operating said contact a predetermined time after operation of said level-responsive device for switching off the pump.

5. A filler as claimed in claim 4 wherein the conduit means are connected to the battery and the pump is switched on, and left on until said level-responsive switch operates.

6. A filler as claimed in claim 3 further comprising an indicator responsive to completion of the predetermined time, and to the level in the sump being below that necessary to operate the level responsive switch.

7. A filler as claimed in claim 1 further comprising a stand pipe leading from the reservoir and into which the pump opens and/or said drain valve opens.

8. A filler as claimed in claim 7 further comprising an explosion minimizing vent connected to said stand pipe.

9. A filler as claimed in claims 7 or 8 in which the cross-sectional area of the stand pipe is greater than that of the pump outlet and/or the drain.

10. A filler as claimed in claim 7 in which the stand pipe opens into the reservoir at a level below that of the conduit means leading to said cells.

11. A filler as claimed in claim 1 the conduit means further comprising means for connection to the battery.

12. A battery filler as claimed in claim 1, each of said cells further comprising a filling device, said conduit means comprising first and second conduits, said first conduit communicating the reservoir to said filling device, and the, second conduit communicating the sump to the filing device of each of said cells being connected in series.

13. A filler as claimed in claim 12 the battery further comprising two way valves normally connecting the filling device of said cells to an exhaust port and means for automatically cutting off communication to the exhaust port when the two conduits are connected to the valves.

14. A filler as claimed in claim 13, further comprising explosion minimizing vents in communication with said exhaust port.

* * * * *